(12) United States Patent
Jang et al.

(10) Patent No.: US 12,719,134 B2
(45) Date of Patent: Aug. 25, 2026

(54) SEPARATOR INCLUDING UNEVEN PORTION, ELECTRODE ASSEMBLY INCLUDING THE SAME, AND METHOD OF MANUFACTURING ELECTRODE ASSEMBLY

(71) Applicant: LG ENERGY SOLUTION, LTD., Seoul (KR)

(72) Inventors: Seok Hoon Jang, Daejeon (KR); Byeong Kyu Lee, Daejeon (KR); Hyeok Jeong, Daejeon (KR); Soon Kwan Kwon, Daejeon (KR); Su Taek Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 669 days.

(21) Appl. No.: 18/030,297

(22) PCT Filed: Mar. 3, 2022

(86) PCT No.: PCT/KR2022/095046
§ 371 (c)(1),
(2) Date: Apr. 5, 2023

(87) PCT Pub. No.: WO2022/270998
PCT Pub. Date: Dec. 29, 2022

(65) Prior Publication Data

US 2023/0378611 A1 Nov. 23, 2023

(30) Foreign Application Priority Data

Jun. 25, 2021 (KR) ........................ 10-2021-0083153
Feb. 22, 2022 (KR) ........................ 10-2022-0022914

(51) Int. Cl.
*H01M 50/463* (2021.01)
*H01M 50/406* (2021.01)
(Continued)

(52) U.S. Cl.
CPC ....... *H01M 50/463* (2021.01); *H01M 50/406* (2021.01); *H01M 50/417* (2021.01);
(Continued)

(58) Field of Classification Search
CPC ............. H01M 50/417; H01M 50/463; H01M 50/406; H01M 50/449; H01M 50/46; H01M 50/403
See application file for complete search history.

(56) References Cited

U.S. PATENT DOCUMENTS

2011/0135996 A1 6/2011 Ahn et al.
2015/0004467 A1 1/2015 Kim et al.
(Continued)

FOREIGN PATENT DOCUMENTS

CN 102610775 A 7/2012
CN 105261779 A 1/2016
(Continued)

OTHER PUBLICATIONS

Machine Translation of JP-6384477(B2) (Year: 2018).*
(Continued)

*Primary Examiner* — Eugenia Wang
(74) *Attorney, Agent, or Firm* — Birch, Stewart, Kolasch & Birch, LLP

(57) ABSTRACT

A separator includes a polyolefin-based separator substrate and a coating portion formed on at least a part of an outer surface of the separator substrate. An uneven portion is formed along an outer periphery of at least one side of the separator, whereby it is possible to prevent deviation of a separator sheet from a movement direction during transfer of the separator sheet and stacking of an electrode assembly.

13 Claims, 4 Drawing Sheets

(51) Int. Cl.
*H01M 50/417* (2021.01)
*H01M 50/449* (2021.01)
*H01M 50/46* (2021.01)
*H01M 50/531* (2021.01)

(52) U.S. Cl.
CPC ......... *H01M 50/449* (2021.01); *H01M 50/46* (2021.01); *H01M 50/531* (2021.01)

(56) References Cited

U.S. PATENT DOCUMENTS

| | | | | |
|---|---|---|---|---|
| 2015/0017509 | A1 | 1/2015 | Okuda et al. | |
| 2015/0270520 | A1* | 9/2015 | Stokes | H01M 50/406 429/246 |
| 2015/0298064 | A1 | 10/2015 | Takagi et al. | |
| 2016/0013459 | A1 | 1/2016 | Suh et al. | |
| 2016/0111699 | A1 | 4/2016 | Ahn et al. | |
| 2017/0110703 | A1 | 4/2017 | Kojima et al. | |
| 2018/0040865 | A1 | 2/2018 | Lee | |
| 2020/0083519 | A1* | 3/2020 | Kim | H01M 50/581 |
| 2022/0181704 | A1 | 6/2022 | Shim et al. | |

FOREIGN PATENT DOCUMENTS

| | | | |
|---|---|---|---|
| CN | 107534116 | A | 1/2018 |
| JP | 2004-55272 | A | 2/2004 |
| JP | 2012-169161 | A | 9/2012 |
| JP | 2013-161633 | A | 8/2013 |
| JP | 2013-211145 | A | 10/2013 |
| JP | 6206185 | B2 | 10/2017 |
| JP | 6384477 | B2 | 9/2018 |
| JP | 2019-75241 | A | 5/2019 |
| JP | 6701522 | B2 | 5/2020 |
| KR | 10-2011-0063899 | A | 6/2011 |
| KR | 10-1084909 | B1 | 11/2011 |
| KR | 10-2016-0056653 | A | 5/2016 |
| KR | 10-2016-0067451 | A | 6/2016 |
| KR | 10-2017-0025489 | A | 3/2017 |
| KR | 10-1904160 | B1 | 10/2018 |
| KR | 10-2020-0113822 | A | 10/2020 |
| KR | 10-2186499 | B1 | 12/2020 |
| WO | WO 2014/199979 | A1 | 12/2014 |
| WO | WO 2015/156344 | A1 | 10/2015 |

OTHER PUBLICATIONS

Extended European Search Report for European Application No. 22828845.2, dated May 9, 2025.

International Search Report (PCT/ISA/210) issued in PCT/KR2022/095046 mailed on Jun. 16, 2022.

* cited by examiner

【FIG. 1】
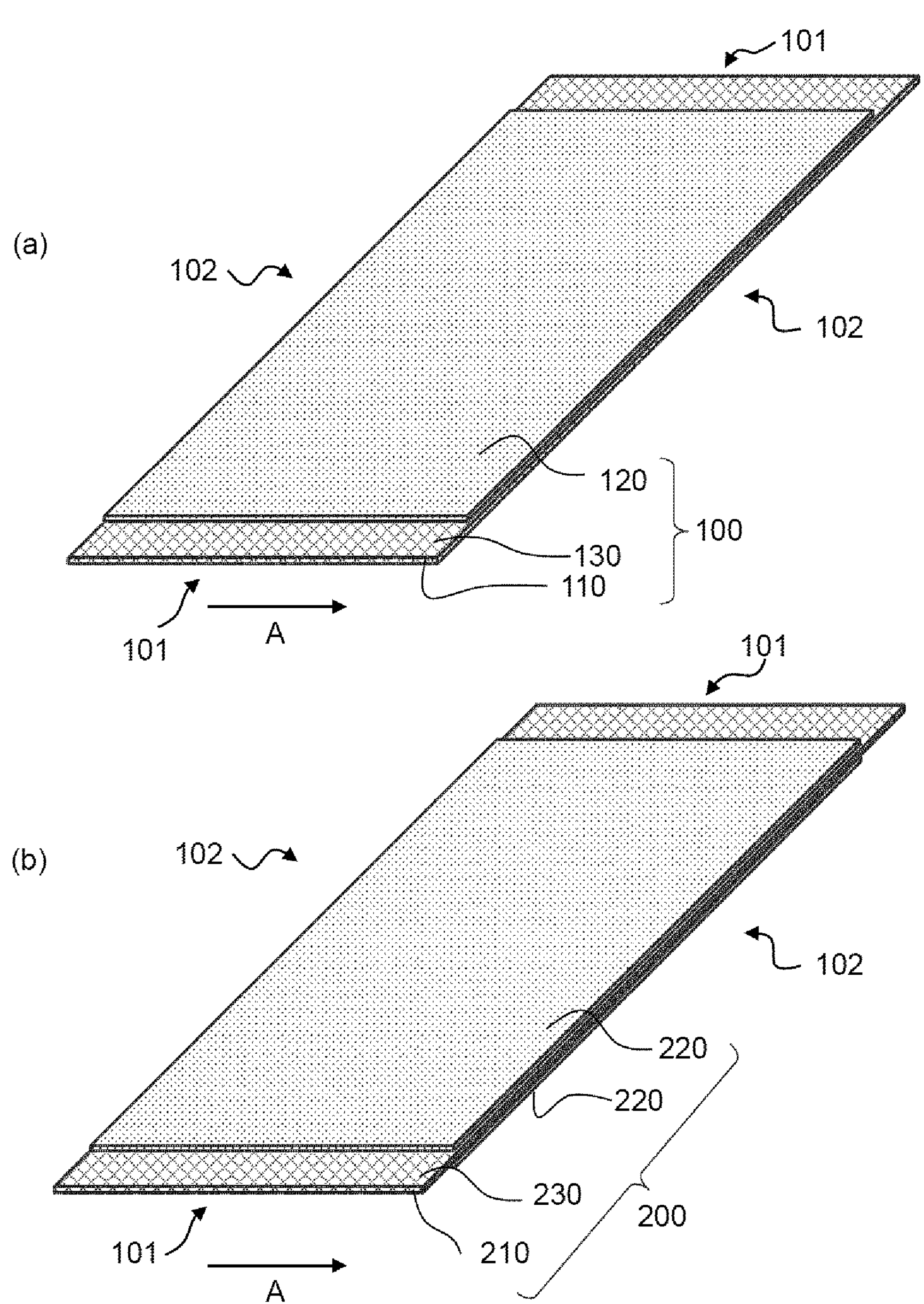

【FIG. 2】
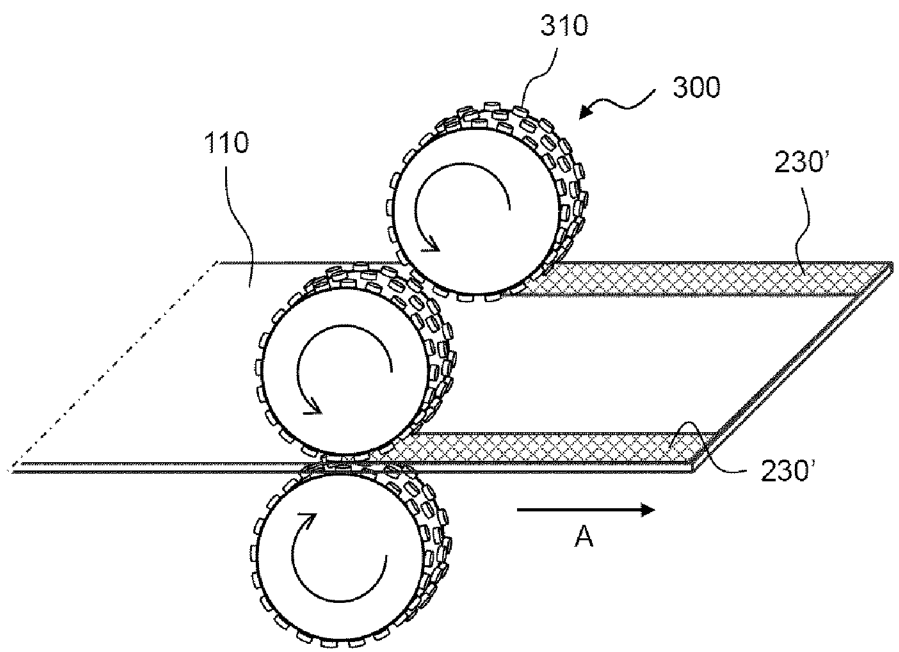
【FIG. 3】
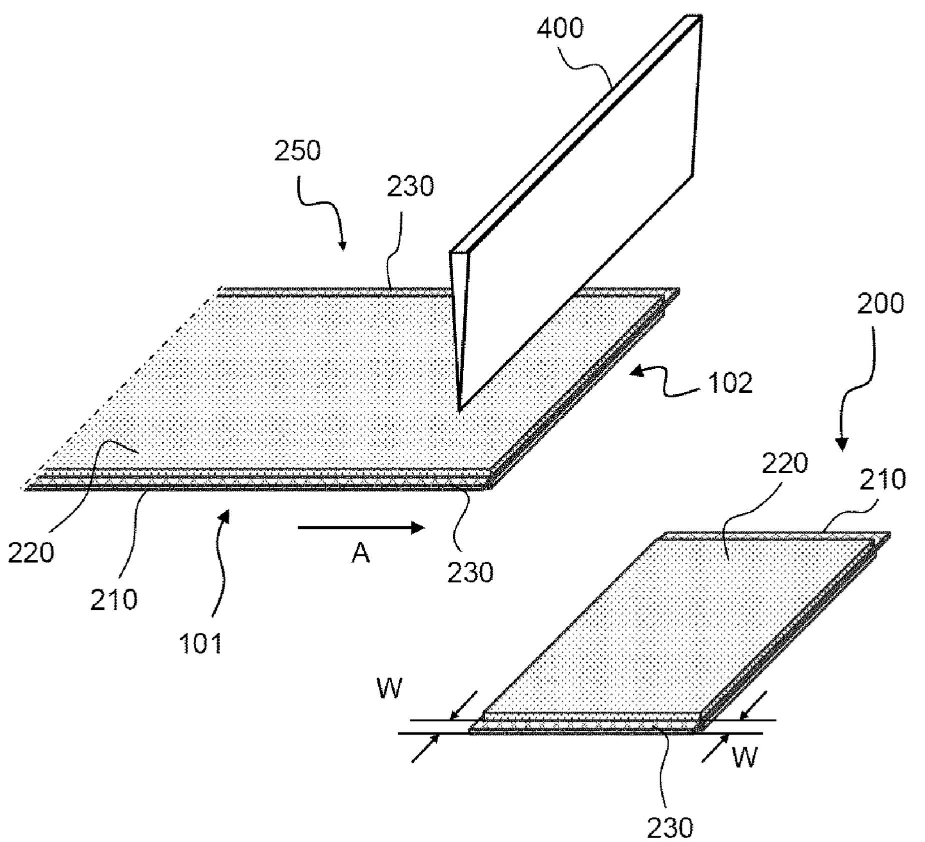

【FIG. 4】
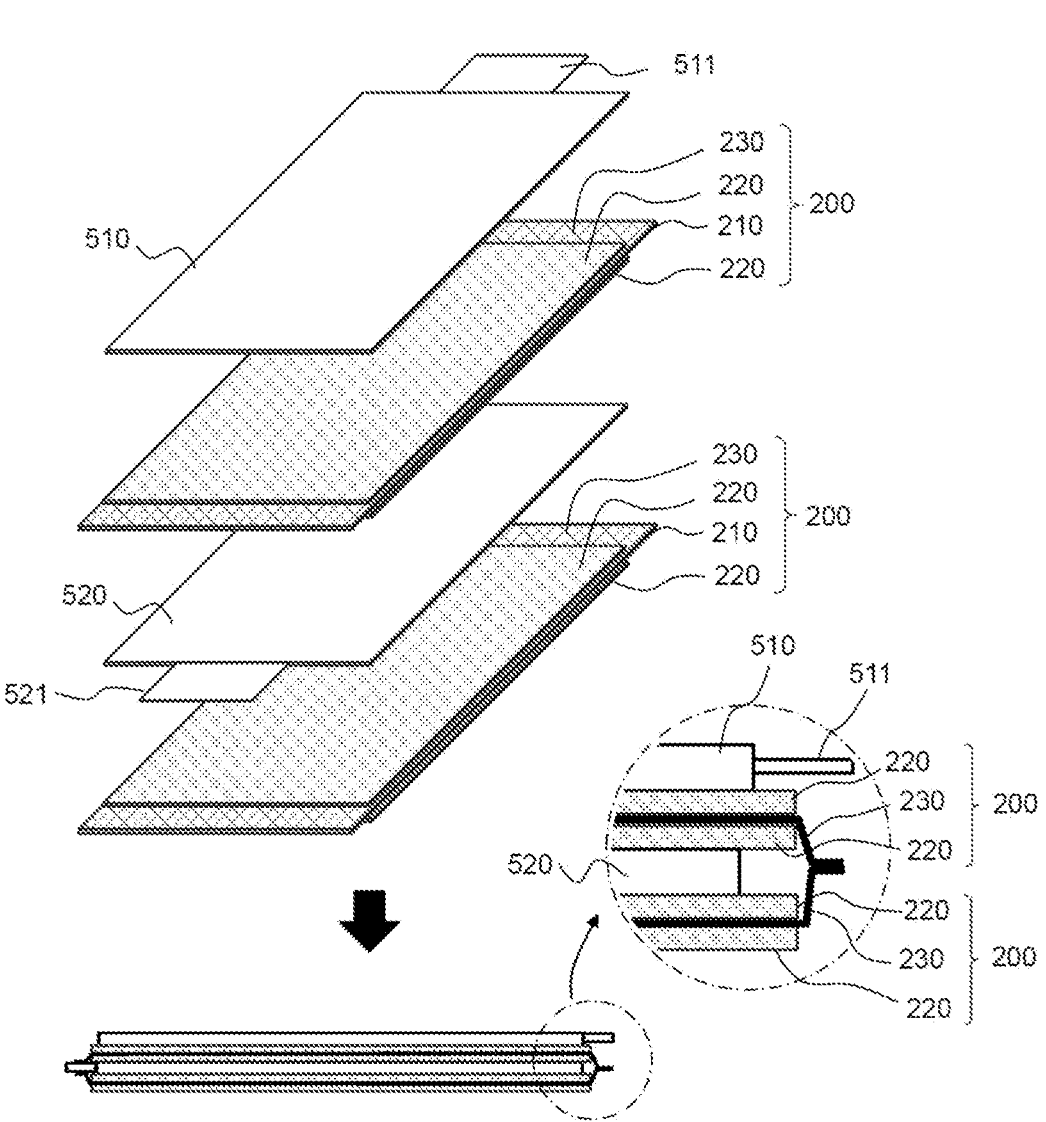

【FIG. 5】
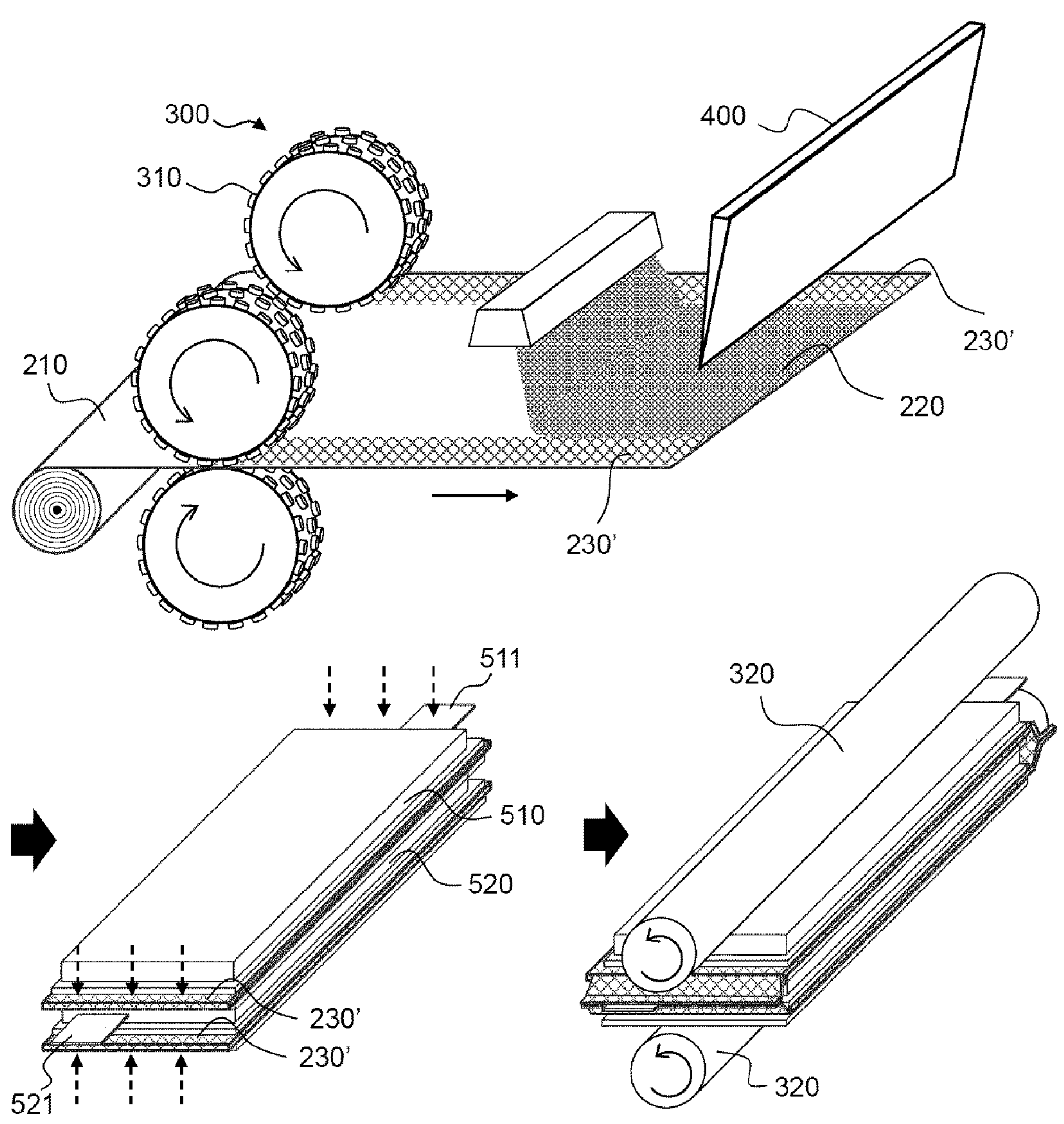

SEPARATOR INCLUDING UNEVEN PORTION, ELECTRODE ASSEMBLY INCLUDING THE SAME, AND METHOD OF MANUFACTURING ELECTRODE ASSEMBLY

TECHNICAL FIELD

This application claims the benefit of priority to Korean Patent Application No. 2021-0083153 filed on Jun. 25, 2021 and Korean Patent Application No. 2022-0022914 filed on Feb. 22, 2022, the disclosures of which are incorporated herein by reference in their entireties.

The present invention relates to a separator including an uneven portion, an electrode assembly including the same, and a method of manufacturing the electrode assembly. More particularly, the present invention relates to a separator for secondary batteries including an uneven portion formed at an end of each side of the separator in order to prevent deviation of the separator from a movement path due to slip thereof during manufacture of an electrode assembly, an electrode assembly including the same, and a method of manufacturing the electrode assembly.

BACKGROUND ART

A lithium secondary battery may be manufactured by receiving an electrode assembly, configured such that a separator is interposed between a positive electrode and a negative electrode, in a battery case, injecting an electrolytic solution, and hermetically sealing the battery case.

The separator, which interrupts electrical connection between the positive electrode and the negative electrode, thereby securing insulation therebetween, may be configured to have a structure in which a coating layer including an inorganic material and a binder is formed on a polyolefin-based separator substrate made of a porous material to allow lithium ions to move. The polyolefin-based material has low resistance to heat, and high-temperature safety and mechanical properties may be improved due to addition of the coating layer.

A process of forming the coating layer on the separator substrate may be performed using a method of forming the coating layer on the separator substrate by coating while transferring a separator sheet wound in a roll shape in a roll-to-roll manner. During transfer of the separator, however, the separator may slip from a transfer roll, whereby the separator may deviate from a movement direction thereof.

In addition, a unit electrode may be disposed on the separator sheet, and the unit electrode and another unit electrode may be stacked and laminated to manufacture an electrode assembly. When the separator is transferred in a state of deviating from the movement direction thereof, however, the position of the electrode disposed on the separator may be changed, whereby the electrodes in the electrode assembly may not be aligned with each other.

In addition, when a separator having a coating layer formed thereon and an electrode are stacked and laminated, it is difficult to sufficiently secure the force of adhesion between the electrode and the separator or between separators only through a lamination process. If the adhesive force is not sufficiently secured, the separator having low force of adhesion to the electrode may be folded during transfer thereof, whereby short circuit between electrodes having different polarities may occur.

In connection therewith, Patent Document 1 discloses a polyolefin-based composite microporous film configured such that a coating layer is formed on a polyolefin-based microporous film, the coating layer is formed in a state of being spaced apart from an edge perimeter of the polyolefin-based microporous film, and a thermally fused section is formed in a non-coating region in which the coating layer is not formed.

Although Patent Document 1 discloses a separator configured such that the thermally fused section is formed at an outer periphery of the polyolefin-based composite microporous film, wherein the separator is thermally fused to a pouch, but does not disclose a construction capable of preventing slip of the separator during transfer thereof.

In Patent Document 2, a non-coating portion, which is not coated with ceramic, is provided at an end of each of an upper part and a lower part of a separator sheet, and the non-coating portions are welded to each other in the state in which two separators are brought into tight contact with each other, whereby a pouch-shaped separator having a positive electrode sheet received therein is formed.

In Patent Document 2, it is possible to securely fix an electrode using the pouch-shaped separator; however, it is not possible to prevent slip of the separator during transfer thereof.

Therefore, there is a need for technology capable of aligning a separator and an electrode with each other such that the positions of the separator and the electrode coincide with each other without additional equipment, such as a position sensor, stably fixing the electrode, and preventing deviation of the separator from a movement direction thereof.

PRIOR ART DOCUMENTS (Patent Document 1) Korean Registered Patent Publication No. 1904160 (2018 Oct. 5)

(Patent Document 2) Japanese Patent Application Publication No. 2013-161633 (2013 Aug. 19)

DISCLOSURE

Technical Problem

The present invention has been made in view of the above problems, and it is an object of the present invention to provide a separator including an uneven portion capable of preventing deviation of the separator from a movement direction thereof and stably fixing an electrode, an electrode assembly including the same, and a method of manufacturing the electrode assembly.

Technical Solution

A separator according to the present invention to accomplish the above object includes a polyolefin-based separator substrate and a coating portion on at least a part of an outer surface of the separator substrate, wherein an uneven portion is provided in the separator substrate, the uneven portion extending along an outer periphery of at least one side of the separator.

In the separator according to the present invention, a non-coating portion, on which the coating portion is not located, may be located on at least one side of an outer periphery of the separator substrate, among outer peripheries of the separator substrate, the coating portion may be located at a remaining part of the separator substrate excluding the non-coating portion, and the uneven portion may be located on the non-coating portion.

In the separator according to the present invention, the separator may include a first outer periphery parallel to a movement direction of a separator sheet to be cut to form the separator and a second outer periphery perpendicular to the first outer periphery, and the uneven portion may be located at an end of the first outer periphery so as to extend in a direction toward the central axis of the movement direction of the separator sheet.

In the separator according to the present invention, the separator may include a first outer periphery parallel to the movement direction of the separator sheet to be cut to form the separator and a second outer periphery perpendicular to the first outer periphery, and the uneven portion may be located at the first outer periphery and the second outer periphery.

In the separator according to the present invention, the uneven portion may have a uniform width.

In the separator according to the present invention, the uneven portion may be provide in one of opposite outer surfaces of the separator substrate.

Alternatively, the uneven portion may be provided in each of the opposite outer surfaces of the separator substrate.

The present invention provides an electrode assembly including a first electrode, a second electrode, and the separator described above provided in plurality as a first separator and a second separator. The first electrode, the first separator, the second electrode, and the second separator are stacked, the first electrode includes a first electrode tab, the second electrode includes a second electrode tab, and the first separator and the second separator are adhered to each other at outer peripheries thereof from which the first electrode tab and the second electrode tab protrude.

In the electrode assembly according to the present invention, the first electrode tab and the second electrode tab may protrude in different directions, the uneven portion of each of the first separator and the second separator may be located where the first electrode tab and the second electrode tab protrude, respectively, and the first separator and the second separator may be adhered to each other at the uneven portions.

In the electrode assembly according to the present invention, the first separator and the second separator may have the same area, and the area of each of the first separator and the second separator may be greater than the area of each of the first electrode and the second electrode.

The present invention provides a method of manufacturing the electrode assembly. Specifically, the method includes preparing each of the first separator and the second separator by preparing the separator substrate, forming the coating portion on the at least the part of the outer surface of the separator substrate, forming the uneven portion at the outer periphery of each of opposite sides of the separator substrate having the coating portion formed. The method further includes sequentially stacking the first electrode, the first separator having the uneven portion formed thereon, the second electrode, the second separator having the uneven portion formed thereon, and thermally fusing the uneven portions of the first separator and the second separator to each other.

In the electrode assembly manufacturing method according to the present invention, for each of the first separator and the second separator, the uneven portion is provided as a pair of uneven portions by forming each uneven portion at an outer periphery of each of opposite sides of the separator substrate and forming the coating portion on a remaining part of the separator substrate on which the uneven portions are not formed.

In the electrode assembly manufacturing method according to the present invention, forming the uneven portion may be performed using a method of passing the separator substrate between a pair of rollers each having an embossing portion formed on a surface thereof.

In the electrode assembly manufacturing method according to the present invention, thermally fusing the uneven portions may include laminating the stacked first electrode, the first separator, the second electrode, and the second separator, and the first separator and the second separator may be thermally fused to each other at outer peripheries thereof from which the first electrode tab and the second electrode tab protrude.

In addition, the present invention may provide possible combinations of the above solving means.

Advantageous Effects

As is apparent from the above description, in the present invention, an uneven portion is formed at an outer periphery of a separator, whereby it is possible to prevent slip of the separator during transfer thereof or to prevent deviation of the separator from a movement direction thereof.

Consequently, an electrode and the separator may be stacked such that outer peripheries thereof are disposed parallel to each other, whereby it is possible to prevent misalignment between the electrode and the separator in an electrode assembly.

In addition, thermal fusion may be performed between separators at uneven portions thereof during a lamination process, whereby it is possible to stably fix the electrode between the separators.

As described above, outer peripheries of the separators are fixed to each other by thermal fusion, whereby it is possible to prevent short circuit due to folding of the separators when the separators are not fixed.

DESCRIPTION OF DRAWINGS

FIG. 1 is a perspective view of a separator according to the present invention.

FIG. 2 is a perspective view showing a process of forming an uneven portion on a non-coating portion.

FIG. 3 is a perspective view showing a process of cutting the separator of FIG. 1 from a separator sheet.

FIG. 4 is an exploded perspective view and a vertical sectional view of an electrode assembly according to the present invention.

FIG. 5 is a schematic view showing an electrode assembly manufacturing process according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 1 is a perspective view of a separator according to the present invention.

Referring to FIG. 1, each of (a) and (b) shows a separator, wherein (a) shows a single-sided coating separator having a coating portion formed only on an upper surface thereof and (b) shows a double-sided coating separator having a coating portion formed on each of upper and lower surfaces thereof.

The separator 100 or 200 according to the present invention includes a separator substrate 110 or 210 made of a polyolefin-based material and a coating portion 120 or 220 formed on at least a part of an outer surface of the separator substrate, wherein a non-coating portion 130 or 230, on which no coating portion is formed, is located along an outer periphery of the separator substrate 110 or 210. That is, the coating portion 120 or 220 is formed on the remaining part of the separator substrate excluding the non-coating portion 130 or 230, and an uneven portion is formed on the non-coating portion 130 or 230, which is formed along an outer periphery of each of opposite sides of the separator.

Unlike this, however, the structure in which the coating portion 120 or 220 is formed on the entirety of the outer surface of the separator substrate 110 or 210 and the uneven portion is formed on the coating portion 120 or 220 along the outer periphery of each of opposite sides of the separator is included in the present invention.

The uneven portion may be configured in the form in which protrusions and/or recesses are continuously formed, and the protrusions and/or recesses may have a predetermined pattern. For example, a lattice pattern or an oblique pattern may be included as the pattern.

Since the uneven portion configured as described above has high frictional force, it is possible to prevent deviation of a separator sheet from a movement direction during transfer of the separator sheet. In addition, during a lamination process for manufacturing an electrode assembly, the force of adhesion between separators due to thermal fusion may be improved. In particular, when the uneven portion is formed on the non-coating portion, the effect of improving the adhesive force during the thermal fusion process may be increased.

The separator substrate 110 includes a first outer periphery 101 parallel to a movement direction A of the separator sheet and a second outer periphery 102 perpendicular to the first outer periphery 101, and the non-coating portion 130 is formed at an end of the first outer periphery 101 so as to extend in a direction toward a central axis of the movement direction A of the separator sheet. Since the uneven portion is formed on the non-coating portion 130, it is possible to obtain the effect of preventing slip of the separator and improving the adhesive force.

In a concrete example, the separator substrate may include a first outer periphery parallel to the movement direction of the separator sheet and a second outer periphery perpendicular to the first outer periphery, and the non-coating portion having the uneven portion formed thereon may be located at each of the first outer periphery and the second outer periphery.

The polyolefin-based material may be at least one selected from the group consisting of polyethylene, polypropylene, and poly-4-methyl-1-pentene using ethylene, propylene, α-olefin, and 4-methyl-1-pentene as a monomer and a comonomer, and a copolymer thereof.

The separator substrate 110 or 210 may have a porous structure in order to secure mobility of lithium ions.

(a) of FIG. 1 shows that the coating portion 120 and the non-coating portion 130 are formed only on an upper surface of the separator substrate and that only the non-coating portion 130 is provided on a lower surface of the separator substrate while no coating portion is included, and (b) of FIG. 1 shows that the coating portion 220 and the non-coating portion 230 are formed on each of the upper surface and the lower surface of the separator substrate. The uneven portion may be formed on at least a part of the non-coating portion 130 or 230 shown in (a) or (b) of FIG. 1.

The coating portion may include inorganic particles and a binder in order to improve ductility and strength of the separator. The inorganic particles may be selected from the group consisting of alumina, aluminum hydroxide, silica, barium oxide, titanium oxide, magnesium oxide, magnesium hydroxide, clay, glass powder, boehmite, and a mixture thereof.

The binder performs a function of maintaining binding between the inorganic particles and improving the force of adhesion between an electrode and the separator, and the kind of the binder is not particularly restricted as long as the binder does not chemically change the coating portion. For example, the binder may be made of at least one selected from the group consisting of polyolefin, such as polyethylene or polypropylene; a fluorine-containing resin, such as polyvinylidene fluoride or polytetrafluoroethylene; a fluorine-containing copolymer, such as a polyvinylidene fluoride-hexafluoropropylene copolymer, a vinylidene fluoride-hexafluoropropylene-tetrafluoroethylene copolymer, or an ethylene-tetrafluoroethylene copolymer; a styrene-butadiene copolymer and a hydride thereof; a (meth)acrylic acid ester copolymer, such as a methacrylic acid ester copolymer, an acrylonitrile acrylic acid ester copolymer, or a styrene acrylic acid ester copolymer; rubber, such as ethylene propylene rubber; polyvinyl acetate; a resin having a melting point or a glass transition temperature of 180° C. or higher, such as polyphenylene ether, polysulfone, polyethersulfone, polyphenylene sulfide, polyetherimide, polyamide, polyimide, polyamide imide, polyetheramide, polyester, aromatic polyester, or polyetheretherketone; polycarbonate; polyacetal; and a water soluble resin, such as carboxyalkyl cellulose, alkyl cellulose, hydroxyalkyl cellulose, starch, polyvinyl alcohol, sodium alginate, polyethylene glycol, cellulose ester, polyacrylic acid, polyacrylic amide, or polymethacrylic acid.

In addition, when the coating portion and the non-coating portion are formed on opposite surfaces of the separator substrate, as shown in (b) of FIG. 1, the binders included in the coating portion formed on the upper surface of the separator substrate and the coating portion formed on the lower surface of the separator substrate may be different in kind from each other.

FIG. 2 is a perspective view showing a process of forming the uneven portion on the non-coating portion.

Referring to FIG. 2, a pair of rollers 300 located at the upper surface and the lower surface of the separator substrate 110 is located at each of opposite ends of the separator substrate 110 parallel to the movement direction A. Each of the rollers 300 has an embossing portion 310 formed on a surface thereof. When the separator substrate 110 passes between the rollers 300, a mark having a shape corresponding to the shape of the embossing portion 310 is formed on each of the parts of the separator substrate pressed by the rollers 300. That is, an uneven portion 230' having a rough surface is formed on a smooth surface of the separator substrate, whereby it is possible to prevent slip of the separator substrate during transfer of the separator substrate to a roll-to-roll process.

Meanwhile, when a separator configured such that the coating portion is formed over the entire area of the separator substrate passes between the rollers having the embossing portions formed on the surfaces thereof, it is possible to manufacture a separator having an uneven portion formed on the coating portion.

FIG. 3 is a perspective view showing a process of cutting the separator of FIG. 1 from a separator sheet.

Referring to FIG. 3, a separator sheet 250 provided to manufacture the separator shown in (b) of FIG. 1 and a separator 200 separated from the separator sheet 250 by cutting using a cutter 400 are shown.

The separator substrate 210 includes a first outer periphery 101 parallel to the movement direction A of the separator sheet 250 and a second outer periphery 102 perpendicular to the first outer periphery 101, and the non-coating portion 230 is formed at the first outer periphery 101 parallel to the movement direction A of the separator sheet 250.

An uneven portion may be formed on the non-coating portion 230 by pressing the separator substrate using a roller having an embossing portion formed on a surface thereof. The uneven portion is formed so as to have a uniform width W.

FIG. 3 shows the separator cut from the separator sheet in the state in which no electrode is attached thereto. Unlike this, however, a first separator sheet having positive electrode plates attached to an outer surface of one side thereof so as to be spaced apart from each other and a second separator sheet having negative electrode plates attached to an outer surface of one side thereof so as to be spaced apart from each other may be laminated in a state of being stacked, uneven portions of the first separator sheet and the second separator sheet may be adhered to each other by heating, and the first separator sheet and the second separator sheet may be cut to manufacture an electrode assembly.

FIG. 4 is an exploded perspective view and a vertical sectional view of an electrode assembly according to the present invention.

Referring to FIG. 4, an electrode assembly configured to have a structure in which two separators 200 are added to an upper surface and a lower surface of a second electrode 520 is shown. That is, a first electrode 510, a separator 200, a second electrode 520, and a separator 200 are sequentially stacked, the first electrode 510 includes a first electrode tab 511, the second electrode 520 includes a second electrode tab 521, each of the separators 200 is provided at an outer periphery of each of opposite sides thereof with a non-coating portion 230, an uneven portion is formed on the non-coating portion 230, and the separators are adhered to each other by thermal fusion at the uneven portions thereof. That is, the separators 200 are adhered to each other at the outer peripheries thereof from which the first electrode tab 511 and the second electrode tab 521 protrude.

The separators 200 have the same area, and the area of each of the separators 200 is greater than the area of each of the first electrode 510 and the second electrode 520 such that thermal fusion is performed at the uneven portions of the separators, as described above.

Although the first electrode 510 and the second electrode 520 may be configured to have the same area, FIG. 4 shows that the area of the first electrode 510 is greater than the area of the second electrode 520. When considering the fact that a negative electrode has a larger size in consideration of irreversibility of lithium ions, the first electrode may be a negative electrode, and the second electrode may be a positive electrode. Alternatively, depending on the kind of a positive electrode active material and a negative electrode active material, the first electrode may be a positive electrode, and the second electrode may be a negative electrode.

The first electrode tab 511 of the first electrode 510 and the second electrode tab 521 of the second electrode 520 protrude in different directions, the non-coating portion 230 having the uneven portion formed thereon is formed at each of the outer peripheries of the separators from which the first electrode tab 511 and the second electrode tab 521 protrude. During a lamination process for manufacturing the electrode assembly, therefore, the separators 200 are adhered to each other at the uneven portions thereof, and each of the separators is adhered to at least a part of an outer surface of the electrode tab, whereby lamination therebetween is performed. Since the separators are adhered to the outer surfaces of the electrode tabs, as described above, it is possible to prevent the separators from being folded during manufacture of a battery cell.

Alternatively, even when electrodes configured such that the first electrode tab 511 and the second electrode tab 521 protrude in the same direction are used, unlike what is shown in FIG. 4, the structure in which adhesion between the uneven portions of the separators is performed while at least a part of each of the first electrode tab 511 and the second electrode tab 521 is covered may be equally applied.

FIG. 5 is a schematic view showing an electrode assembly manufacturing process according to the present invention.

Referring to FIG. 5, in the electrode assembly manufacturing process according to the present invention, a polyolefin-based separator substrate 210 is transferred while being unwound from a separator roll, and an uneven portion 230' is formed at each of opposite sides of the separator substrate 210. A coating solution is applied to the remaining part of the separator substrate 210, on which the uneven portion 230' is not formed, to form a coating portion 220. Consequently, the part of the separator substrate on which the uneven portion 230' is formed becomes a non-coating portion, to which no coating solution has been applied, and the coating portion 220 and the non-coating portion, on which the uneven portion 230' is formed, are formed together at one surface of a separator sheet. FIG. 5 shows that the coating portion 220 and the uneven portion 230' are formed only on an upper surface of the separator substrate 210. However, the coating portion 220 and the uneven portion 230' may also be formed on a lower surface of the separator substrate 210 using the same method as the upper coating portion formation method.

The separator manufactured as described above may include a first separator and a second separator. The first separator, a first electrode 510, the second separator, and a second electrode 520 are sequentially stacked, pressure and heat are applied to the uneven portions 230' of the first separator and the second separator in directions indicated by dotted-line arrows such that uneven portions are thermally fused to each other. Through the above process, the separators and the electrodes may be aligned with each other such that the positions of the separators and the electrodes coincide with each other and may then be fixed to each other, and surplus portions of the separators extending farther outwards than outer peripheries of the electrodes may be adhered to each other and may then be fixed to each other, whereby it is possible to prevent folding or rolling of the surplus portions of the separators.

A method of allowing the separator substrate 210 to pass between a pair of rollers 300 each having an embossing portion 310 formed on a surface thereof may be used as a method of forming the uneven portion 230'.

The thermal fusion step may include a lamination step of applying heat and pressure to the first separator, the first electrode 510, the second separator, and the second electrode 520 while allowing the first separator, the first electrode, the second separator, and the second electrode to pass between a pair of lamination rolls 320 in the state in which the first separator, the first electrode, the second separator, and the second electrode are stacked. The first separator and the second separator are thermally fused to each other at outer peripheries thereof from which the first electrode tab 511 and the second electrode tab 521 protrude.

For example, when the force of adhesion between the first separator and the second separator is high, a process of thermally fusing the first separator and the second separator to each other after a stack constituted by the first separator, the first electrode, the second separator, and the second electrode passes between the lamination rolls may be performed. When the force of adhesion between the first separator and the second separator is low, on the other hand, the uneven portions may be thermally fused to each other by the lamination rolls, and at the same time the stack may be laminated. Alternatively, the uneven portions may be thermally fused to each other and then lamination may be performed.

In a concrete example, a method of manufacturing an electrode assembly including a separator having an uneven portion formed on a coating portion of the separator includes (a) a step of preparing a separator substrate, (b) a step of forming a coating portion on at least a part of an outer surface of the separator substrate, (c) a step of forming an uneven portion at an outer periphery of each of opposite sides of a separator having the coating portion formed thereon, (d) a step of sequentially stacking a first separator having the uneven portion formed thereon, a first electrode, a second separator having the uneven portion formed thereon, and a second electrode, and (e) a step of thermally fusing the uneven portions of the first separator and the second electrode to each other.

In the step of forming the uneven portion, the uneven portion is formed on the coating portion of the outer surface of the separator substrate.

That is, the electrode assembly manufacturing method according to the above concrete example is different from the electrode assembly manufacturing method shown in FIG. 5 in that the separator is manufactured by forming the uneven portion after the coating portion is formed on the separator substrate in order to form the uneven portion on the coating portion.

Alternatively, in the step of forming the uneven portion, the uneven portion may be formed on the non-coating portion of the separator substrate, as shown in FIG. 5.

In the present invention, as described above, the uneven portion may be formed at the outer periphery of the separator in the direction in which the electrode tab protrudes, among the outer peripheries of the separator, whereby it is possible to improve the force of adhesion between the separators and furthermore to improve the force of binding between the separator and the electrode.

Those skilled in the art to which the present invention pertains will appreciate that various applications and modifications are possible within the category of the present invention based on the above description.

DESCRIPTION OF REFERENCE SYMBOLS

100, 200: Separators
101: First outer periphery
102: Second outer periphery
110, 210: Separator substrates
120, 220: Coating portions
130, 230: Non-coating portions
230': Uneven portion
250: Separator sheet
300: Roller
310: Embossing portion
320: Lamination roll
400: Cutter
510: First electrode
511: First electrode tab
520: Second electrode
521: Second electrode tab
A: Movement direction of separator sheet
W: Width of uneven portion

The invention claimed is:

1. A separator comprising:

a polyolefin-based separator substrate; and a coating portion on at least a part of an outer surface of the separator substrate, wherein an uneven portion is provided in the separator substrate, the uneven portion extending along an outer periphery of at least one side of the separator, wherein a non-coating portion, on which the coating portion is not located, is located on at least one side of an outer periphery of the separator substrate, among outer peripheries of the separator substrate, wherein the coating portion is located at a remaining part of the separator substrate excluding the non-coating portion, and wherein the uneven portion is located on the non-coating portion.

2. The separator according to claim 1, wherein the separator comprises a first outer periphery parallel to a movement direction of a separator sheet to be cut to form the separator and a second outer periphery perpendicular to the first outer periphery, and wherein the uneven portion is located at an end of the first outer periphery so as to extend in a direction toward a central axis of the movement direction of the separator sheet.

3. The separator according to claim 2, wherein the uneven portion has a uniform width.

4. The separator according to claim 1, wherein the separator comprises a first outer periphery parallel to a movement direction of a separator sheet to be cut to form the separator and a second outer periphery perpendicular to the first outer periphery, and the uneven portion is located at the first outer periphery and the second outer periphery.

5. The separator according to claim 1, wherein the uneven portion is provided in one of opposite outer surfaces of the separator substrate.

6. The separator according to claim 1, wherein the uneven portion is provided in each of opposite outer surfaces of the separator substrate.

7. An electrode assembly comprising;

a first electrode;

a second electrode; and the separator according to claim 1, the separator being provided in plurality as a first separator and a second separator, wherein the first electrode, the first separator, the second electrode, and the second separator are stacked, wherein the first electrode comprises a first electrode tab, wherein the second electrode comprises a second electrode tab, and wherein the first separator and the second separator are adhered to each other at outer peripheries thereof from which the first electrode tab and the second electrode tab protrude.

8. The electrode assembly according to claim 7, wherein the first electrode tab and the second electrode tab protrude in different directions, wherein the uneven portion of each of the first separator and the second separator is located where the first electrode tab and the second electrode tab protrude, respectively, and wherein the first separator and the second separator are adhered to each other at the uneven portions.

9. The electrode assembly according to claim 7, wherein the first separator and the second separator have an identical area, and wherein the area of each of the first separator and the second separator is greater than an area of each of the first electrode and the second electrode.

10. A method of manufacturing the electrode assembly according to claim 7, the method comprising:

preparing each of the first separator and the second separator, including:

preparing the separator substrate;

forming the coating portion on the at least the part of the outer surface of the separator substrate;

forming the uneven portion at the outer periphery of each of opposite sides of the separator substrate having the coating portion formed thereon;

sequentially stacking the first electrode, the first separator having the uneven portion formed thereon, the second electrode, and the second separator having the uneven portion formed thereon; and thermally fusing the uneven portions of the first separator and the second separator to each other.

11. The method according to claim 10, wherein, for each of the first separator and the second separator, the uneven portion is provided as a pair of uneven portions by forming each uneven portion at an outer periphery of each of opposite sides of the separator substrate and forming the coating portion on a remaining part of the separator substrate on which the uneven portions are not formed.

12. The method according to claim 10, wherein forming the uneven portion is performed using a method of passing a separator substrate between a pair of rollers each having an embossing portion formed on a surface thereof.

13. The method according to claim 10, wherein the thermally fusing the uneven portions comprises laminating the stacked first electrode, the first separator, the second electrode, and the second separator, and wherein the first separator and the second separator are thermally fused to each other at outer peripheries thereof from which the first electrode tab and the second electrode tab protrude.

* * * * *